Sept. 8, 1953
C. L. SPINNEY
2,651,333
WORKTABLE FIXTURE FOR PORTABLE MOTOR-DRIVEN SAWS
Filed April 12, 1950
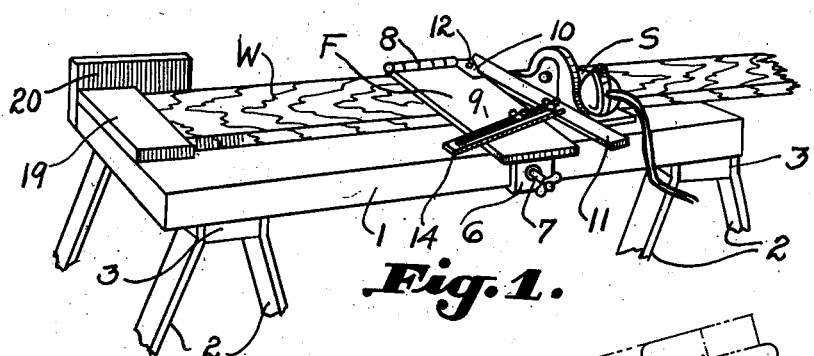
Fig. 1.
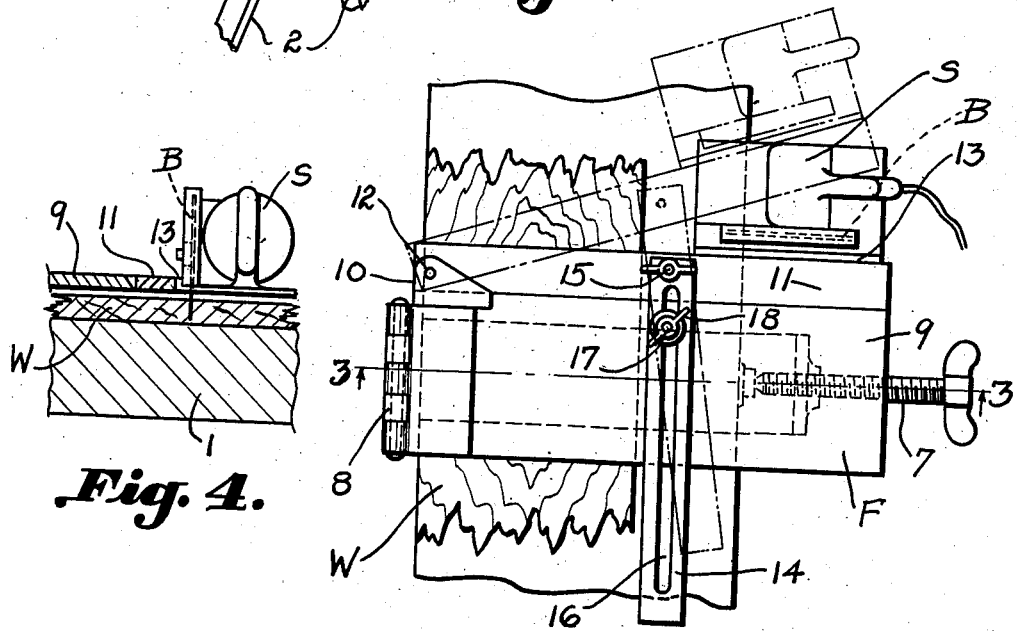
Fig. 4.
Fig. 2.
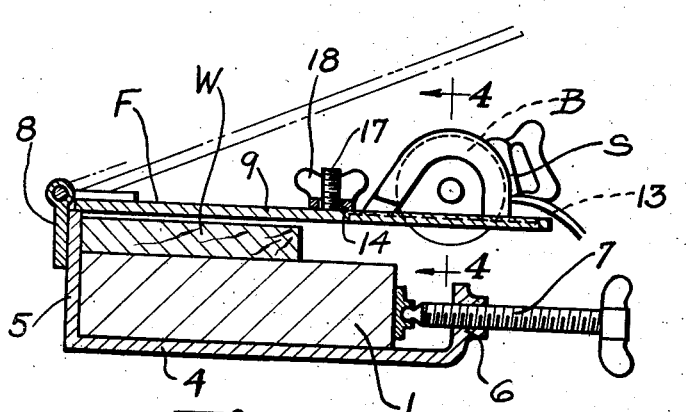
Fig. 3.
INVENTOR
CHESTER L. SPINNEY
By Owen W. Kennedy
ATTORNEY Patented Sept. 8, 1953

2,651,333

UNITED STATES PATENT OFFICE 2,651,333

WORKTABLE FIXTURE FOR PORTABLE MOTOR-DRIVEN SAWS

Chester L. Spinney, Barre, Mass.

Application April 12, 1950, Serial No. 155,414

4 Claims. (Cl. 143—6)

The present invention relates to an improved worktable fixture for use with portable motor driven saws of the type that are commonly employed by carpenters for cutting pieces of lumber to desired dimensions on building operations, and the like. Such portable saws are taking the place of ordinary hand saws, particularly where the lumber to be cut is of considerable cross-sectional size, as with studding and framing, and it is often necessary to cut a large number of pieces of exactly the same length, or shape.

The object of the present invention is to increase the usefulness of such portable saws by providing an improved worktable fixture adapted to readily receive a piece of lumber that is to be cut, and providing transversely of the piece of lumber, a straight guiding edge along which the saw can be moved in making a cut at a predetermined distance from a fixed point on the worktable. When once the fixture has been set with respect to the fixed point, it is possible to successively position pieces of lumber within the fixture, and to remove them after cutting by the portable saw, with the assurance that each piece of lumber will be of exactly the same length. Furthermore, the fixture is so constructed, that the angle of the saw guiding edge is adjustable, thereby making it possible to successively cut pieces of lumber at any desired angle, with the assurance that the angle of cut will be the same in each piece.

The above and other advantageous features of the invention will hereinafter more fully appear from the following description considered in connection with the accompanying drawings, in which, Fig. 1 is a view in perspective showing a worktable with my improved fixture applied thereto, and illustrating the use of a portable saw in connection with a workpiece in the fixture.

Fig. 2 is a plan view on an enlarged scale of the fixture shown in Fig. 1, and illustrating the manner in which a cut may be made by a portable saw at different angles.

Fig. 3 is a transverse sectional view along the line 3—3 of Fig. 2, looking in the direction of the arrows.

Fig. 4 is a fragmentary sectional view illustrating the manner in which the portable saw makes a cut through a workpiece, in cooperation with the fixture.

Referring first to Fig. 1, the invention is shown for purposes of illustration as being used in connection with a suitable worktable 1 that is supported above the ground at a convenient height by legs 2, provided by a pair of ordinary carpenters' horses 3. The worktable 1 can be set up at any desired location, convenient to a lumber pile, where the horses 3 may be placed to support the worktable between them.

According to the present invention, the worktable 1 is provided with a fixture F, which as best shown in Fig. 3, consists of a channel-shaped bracket, the base 4 of which is wide enough to freely receive the table 1 between upwardly extending legs 5 and 6. The legs 5 and 6 are of different lengths, and the shorter leg 6 provides a screw clamp 7, the end of which is adapted to engage one edge of table 1. Therefore, when the clamp 7 is screwed tightly, while holding the base 4 in engagement with the underside of the table 1, the longer leg 5 will extend above the worktable 1 at right angles to the plane of the table.

The upper end of the leg 5 provides a hinge 8, to which is connected a plate 9, and the inner edge of the plate 9 is adapted to rest upon the upper edge of the leg 5, so as to support the plate in parallel relation with respect to the table 1. The plate 9 can be swung upwardly about the hinge 8, as indicated in dotted lines in Fig. 3, so as to permit a piece of lumber to be inserted between the plate 9 and the table 1, with one edge of the piece in engagement with the leg 5, preparatory to being cut by a portable motor driven saw, in cooperation with the fixture F.

As best shown in Fig. 2, one edge of the plate 9 adjacent to the hinge 8, provides a lug 10 on which a guide 11 is mounted for swinging movement about a pin 12 extending vertically from the lug 10. The straight edges of the guide 11 are parallel, and when the guide 11 occupies the full line position of Fig. 2, with one edge in engagement with the plate 9, the opposite edge will extend at right angles to any workpiece W that has been previously positioned between the table 1, and the plate 9, with one edge thereof bearing against the leg 5 of the fixture F.

As previously pointed out, the fixture F of the present invention is adapted to cooperate with a portable motor driven saw, so as to insure that successive cuts can be made accurately on different workpieces W, and with the guide 11 in the full line position of Fig. 2, its outer edge will serve to guide the straight-edge 13 that is provided on one side of a portable saw S. The saw S shown in Fig. 2, is of a conventional type, in which the straight-edge 13 is parallel to and at a fixed distance from the plane of the circular saw blade B, indicated in dotted lines, as being enclosed within the usual guard. Therefore, should the saw S be moved across the workpiece W from the full line position of Fig. 2, with its straight-edge 13 bearing on the guide 11, the saw blade B will make a cut cross the workpiece W at right angles to its longitudinal edges.

Should it be desired to cut the workpiece W at an angle, other than a right angle, as when cutting joints for rafters and studs, the fixture F provides means for varying the angle between the guide 11 and the plate 9. For this purpose, the guide 11 provides an arm 14 turnable on a vertical stud 15 projecting from the guide 11, with the arm 14 providing a slot 16 which extends across the plate 9. The slot 16 receives a stud 17 extending upwardly from the plate 9, and the upper end of the stud 17 provides a wingnut 18.

By turning down the wingnut 18 on the stud 17, the arm 14 can be clamped to the plate 9, so that the guide 11 will be maintained in any given position with respect to the plate 9. With the parts occupying the full line position of Fig. 2, the guide 11 has been clamped so that the inner edge thereof is in close engagement with one edge of the plate 9. In this position, the outside edge will serve to guide the straight-edge 13 of the saw blade B, so as to make a cut at right angles across the workpiece W. However, upon loosening the wingnut 18, the guide 11 may be swung about its pivot pin 12 into the dotted line position of Fig. 2, with the slot 16 in the arm 14 permitting such movement, since the arm 14 is pivotally mounted on the guide 11 by the stud 15. When the desired angular adjustment of the guide 11 has been made, it can be clamped securely in that position by turning down the wingnut 18 to engage the arm 14 on either side of the slot 16. The outer edge of the guide 11 will then serve to direct the straight-edge 13 of the saw S, so that its blade B will make a cut across the workpiece W at the desired angle, with relation to the edge which engages the leg 5 of the fixture F.

As previously pointed out, the fixture F is readily applied to any table 1 which is in the form of a heavy plank that can be set up between the sawhorses 3. Should it be desired to cut a number of boards of equal length from stock pieces of lumber of different lengths, the table 1 is provided with an end stop 19 secured to the flat top of the table, and an edge stop 20 secured to the outer edge of the table. Thus, the two stops 19 and 20 provide between them, two fixed surfaces at right angles to each other, for receiving one corner of a workpiece W, as shown in Fig. 1.

The particular length which it is desired to cut from the workpiece W is then measured along the table 1 from the stop 19 to the outer edge of the guide 11, and obviously, the edge of the guide can be set very accurately by shifting the fixture F slightly on the table 1, after loosening the screw clamp 7. When making the final adjustment of the fixture F, preparatory to sawing a number of workpieces W to equal length, the outer edge of the guide 11 is set back from the measured length, an amount equal to the distance between the face of the straight-edge 13 of the saw S, and the plane of its blade B. This distance is fixed, and always remains the same so long as that particular saw is being used, so that once the fixture F has been set to compensate for this known distance, successive workpieces W will be cut to exactly the same length by moving the saw S across each workpiece, while maintaining its straight-edge 13 in close engagement with the outer edge of the guide 11.

The above described procedure for setting up and using the fixture F is purely illustrative, and of course, can be varied to suit the needs of any particular job that is being done. For example, should it be desired to reproduce a workpiece that has already been cut, it is only necessary to lay that workpiece on the table 1, with its squared end in engagement with the stops 19 and 20, and then move the fixture F along the table 1 until the outer edge of its guide 11 registers with the other squared end of the master workpiece. The fixture F is then moved towards the stop 19 until the edge of the guide 11 is separated from the end of the workpiece, a distance corresponding to the known distance between the saw straight-edge 13, and its blade B, whereupon, the fixture is ready to receive workpieces, all of which can be cut to a length exactly corresponding to that of the master workpiece.

Should the master workpiece have one end cut diagonally, the same general procedure can be followed by loosening the wingnut 18, and swinging the guide 11 until its outer edge registers with the diagonal cut, as indicated in dotted lines in Fig. 2. When this has been done, the fixture F is shifted toward the stop 19 until the proper compensation has been made for the displacement between the straight-edge 13 and the saw blade B, it being noted that the guide 11 will remain parallel to the diagonal cut of the master workpiece when the compensating adjustment is made.

From the foregoing it is apparent that by the present invention, there is provided an improved worktable fixture for use with portable motor driven saws, whereby workpieces, such as boards, studs and rafters can be cut to predetermined lengths, with the assurance that all lengths cut with a given adjustment of the fixture, will be the same. Furthermore, the same fixture permits workpieces to be cut diagonally, with absolute assurance that the angular cuts will be the same for successive workpieces.

I claim:

1. A worktable attachment comprising in combination, a worktable for supporting a workpiece, a fixture adjustable longitudinally of said worktable and providing a portion extending along one edge of said worktable and above the surface thereof, a hinged plate mounted on said upstanding fixture portion and extending across said worktable to permit the insertion of a workpiece, and its engagement with said upstanding fixture portion, when said plate is swung upwardly, and a guide mounted on said plate providing a straight-edge extending across the workpiece for cooperation with the straight-edge of a portable motor driven saw, with said guide being turnable about a vertical pivot on said plate to determine the angle of the cut made by said saw with respect to said upstanding fixture portion, as said saw is moved across the workpiece with said straight-edges in engagement.

2. A worktable attachment comprising in combination, a worktable for supporting a workpiece, a fixture adjustable longitudinally of said worktable and providing a portion extending along one edge of said worktable and above the surface thereof, a hinged plate mounted on said upstanding fixture portion and extending across said worktable to permit the insertion of a workpiece, and its engagement with said upstanding fixture portion, when said plate is swung upwardly, a guide mounted on said plate providing a straight-edge extending across the workpiece for cooperation with the straight-edge of a portable motor driven saw, with said guide being turnable about a vertical pivot provided by said plate, and means for clamping said guide in adjusted position on said plate so that its straight-edge extends at a predetermined angle with respect to a longitudinal edge of the workpiece, which edge is in engagement with said upstanding fixture portion.

3. A worktable fixture for use with a portable motor driven saw, comprising a bracket having a portion extending beneath a worktable with upwardly extending parallel legs attached to the ends of said bracket portion to embrace the worktable, one of said bracket legs carrying a clamping device engaging one edge of the worktable to maintain the other of said legs in engagement with the worktable's other edge, with a portion of said second leg projecting above the top surface of the worktable, a hinged plate mounted on the upstanding portion of said leg and extending across said worktable to permit the insertion of a workpiece and engagement of one edge thereof with said upstanding leg portion in the space above said worktable, when said plate is swung upwardly, a guide pivotally mounted on said plate to turn about a vertical axis and providing a straight-edge extending across said workpiece, and means for clamping said guide on said plate at a predetermined angle in a horizontal plane with respect to the edge of the workpiece that is in engagement with said upstanding leg portion.

4. A worktable attachment comprising in combination, a clamp for engaging a worktable and providing a guide member extending along one side of the worktable and projecting above the surface thereof, a member extending across the worktable and hinged to said guide member to permit the positioning of a workpiece on top of said worktable, with one edge thereof in engagement with said guide member, when said hinged member is swung upwardly, a second guide member having a straight-edge for guiding a portable motor driven saw, said second guide member being pivotally mounted to turn about a vertical axis on said hinged member so as to extend across the workpiece, and means for clamping said second guide member at a predetermined angle in a horizontal plane with respect to said first guide member.

CHESTER L. SPINNEY.

References Cited in the file of this patent

UNITED STATES PATENTS

| Number | Name | Date |
| --- | --- | --- |
| 1,332,714 | D'Arcy et al. | Mar. 2, 1920 |
| 1,457,492 | Bloodgood | June 5, 1923 |
| 1,618,341 | Howland | Feb. 22, 1927 |
| 1,700,189 | Wikstrom | Jan. 29, 1929 |
| 1,828,043 | Hedgpeth | Oct. 20, 1931 |
| 1,832,283 | Earhart | Nov. 17, 1931 |
| 1,911,045 | Tinnen | May 23, 1933 |
| 2,032,976 | Carter | Mar. 3, 1936 |
| 2,478,828 | Larson | Aug. 9, 1949 |
| 2,502,640 | Coleman | Apr. 4, 1950 |
| 2,556,137 | Emmons | June 5, 1951 |